(12) United States Patent
Ward et al.

(10) Patent No.: US 7,951,030 B2
(45) Date of Patent: May 31, 2011

(54) TENSIONER

(75) Inventors: Peter Alan Ward, Farmington Hills, MI (US); Juergen Hallen, Aachen (DE)

(73) Assignee: The Gates Corporation, Denver, CO (US)

( * ) Notice: Subject to any disclaimer, the term of this patent is extended or adjusted under 35 U.S.C. 154(b) by 361 days.

(21) Appl. No.: 12/315,713

(22) Filed: Dec. 4, 2008

(65) Prior Publication Data

US 2010/0144473 A1    Jun. 10, 2010

(51) Int. Cl.
*F16H 7/10* (2006.01)
(52) U.S. Cl. .......................................... 474/112; 474/135
(58) Field of Classification Search .................. 474/101, 474/109, 112, 135
See application file for complete search history.

(56) References Cited

U.S. PATENT DOCUMENTS

| | | | |
|---|---|---|---|
| 4,689,037 A | 8/1987 | Bytzek | 474/135 |
| 5,236,396 A * | 8/1993 | Golovatai-Schmidt et al. | 474/101 |
| 5,458,541 A * | 10/1995 | Adler et al. | 474/135 |
| 5,503,599 A * | 4/1996 | Brehler et al. | 474/112 |
| 5,919,107 A | 7/1999 | Stepniak | 474/112 |
| 6,468,172 B1 * | 10/2002 | Lang et al. | 474/135 |
| 6,592,482 B2 | 7/2003 | Serkh | 474/135 |
| 6,857,977 B1 * | 2/2005 | Bertelshofer et al. | 474/117 |
| 6,932,731 B2 * | 8/2005 | Kaiser et al. | 474/135 |
| 7,850,560 B2 * | 12/2010 | Arneth et al. | 474/112 |

FOREIGN PATENT DOCUMENTS

| | | |
|---|---|---|
| WO | WO 2006/111988 A1 | 10/2006 |
| WO | WO 2007/036959 A1 | 4/2007 |
| WO | WO 2007/036960 A1 | 4/2007 |

* cited by examiner

*Primary Examiner* — Sang Kim
(74) *Attorney, Agent, or Firm* — J. A. Thurnau, Esq.; T. A. Dougherty, Esq.; P. N. Dunlap, Esq.

(57) ABSTRACT

A tensioner comprising a base, an arm pivotally engaged with the base, a pulley journalled to the arm, a torsion spring engaged between the arm and the base, the base comprising a cantilever leaf spring, a first friction disk operationally disposed between the cantilever leaf spring and the arm, the cantilever leaf spring biasing the first friction disk into frictional contact with the arm, the first friction disk rotationally fixed with respect to the base, a second friction disk rotationally fixed with respect to the base, a separator member disposed between the first friction disk and the second friction disk, the first friction disk and the second friction disk each having a wet coefficient of friction of approximately 0.12, and the separator member rotationally fixed with respect to the arm.

6 Claims, 2 Drawing Sheets

TENSIONER

FIELD OF THE INVENTION

The invention relates to a tensioner, and more particularly, a tensioner having a base comprising a cantilever leaf spring for biasing a friction disk into frictional contact with an arm.

BACKGROUND OF THE INVENTION

The two most common methods synchronously driving rotating members such as cam shafts and balance shafts from a crankshaft are timing chains and belts. Timing chains require engine oil to operate. In comparison most timing belt applications require that no oil be present in the belt drive as the presence of oil can damage the belt and inhibit its intended purpose. Recent improvements in belts no long require that a belt be isolated from the engine oil environment.

The recent improvement of belts to operate in oil, however poses other problems that need to be solved. One specific problem is properly tensioning the belt drive to keep the camshaft synchronized with the crankshaft. Should the camshaft or other synchronized driven crankshaft component loose synchronization with the crankshaft catastrophic engine damage can result.

To transmit power through the belt from the rotating crankshaft one side of the belt is pulled around the crankshaft and is commonly referred to as the belt tight side by those skilled in the art. Conversely the other side is referred to as the belt slack side, since the belt is being "pushed" away from the crankshaft. It is important to provide tensioning to the slack side of the belt to prevent the belt from becoming unduly slack and thus causing a loss of synchronization between the crankshaft and the components rotated by the crankshaft. This loss of synchronization is commonly referred to as "tooth jump" or "ratcheting" by those skilled in the art.

Compounding the problem of eliminating belt slack to prevent tooth jump or ratcheting is excessive tensioner arm motion or vibration induced by the engine's angular vibration. Excessive arm motion could not only lead to a tooth jump or ratcheting condition, but can also reduce the useful life of the tensioner and the belt as well. To minimize the amount of arm vibration friction damping is commonly used to prevent the tensioner from moving away from the belt.

The presence of oil makes friction damping difficult to achieve. Application of a lubricant to two rubbing surfaces will allow relative motion between the two surfaces to occur more easily.

Representative of the art is U.S. Pat. No. 5,919,107 (1999) which discloses a belt tensioner for tensioning a drive belt or timing belt comprises an eccentric adjusting member having an end surface thereof constructed and arranged to be mounted directly in surface-to-surface engagement with respect to a belt tensioner mounting surface for an engine frame. A pivoted structure is mounted on the eccentric adjusting member for pivoted movement between a first position and a second position, and a belt tensioning pulley is mounted for rotational movement on the pivoted structure. A coil torsion spring is constructed and arranged to resiliently bias the pivoted structure in a belt tightening direction away from the first position and toward the second position, the eccentric adjusting member being movable during an installation procedure to move the pivoted structure against the bias of the coil torsion spring into a position wherein the belt tensioning pulley is disposed in predetermined static tensioning relation with the belt, at which point the eccentric adjusting member is to be manually fixed. The end surface of the eccentric adjusting member is in sliding surface-to-surface relation with the mounting surface during rotation of the eccentric adjusting member.

What is needed is a tensioner having a base comprising a cantilever leaf spring for biasing a friction disk into frictional contact with an arm. The present invention meets this need.

SUMMARY OF THE INVENTION

The primary aspect of the invention is to provide a tensioner having a base comprising a cantilever leaf spring for biasing a friction disk into frictional contact with an arm.

Other aspects of the invention will be pointed out or made obvious by the following description of the invention and the accompanying drawings.

The invention comprises a tensioner comprising a base, an arm pivotally engaged with the base, a pulley journalled to the arm, a torsion spring engaged between the arm and the base, the base comprising a cantilever leaf spring, a first friction disk operationally disposed between the cantilever leaf spring and the arm, the cantilever leaf spring biasing the first friction disk into frictional contact with the arm, the first friction disk rotationally fixed with respect to the base, a second friction disk rotationally fixed with respect to the base, a separator member disposed between the first friction disk and the second friction disk, the first friction disk and the second friction disk each having a wet coefficient of friction of approximately 0.12, and the separator member rotationally fixed with respect to the arm.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
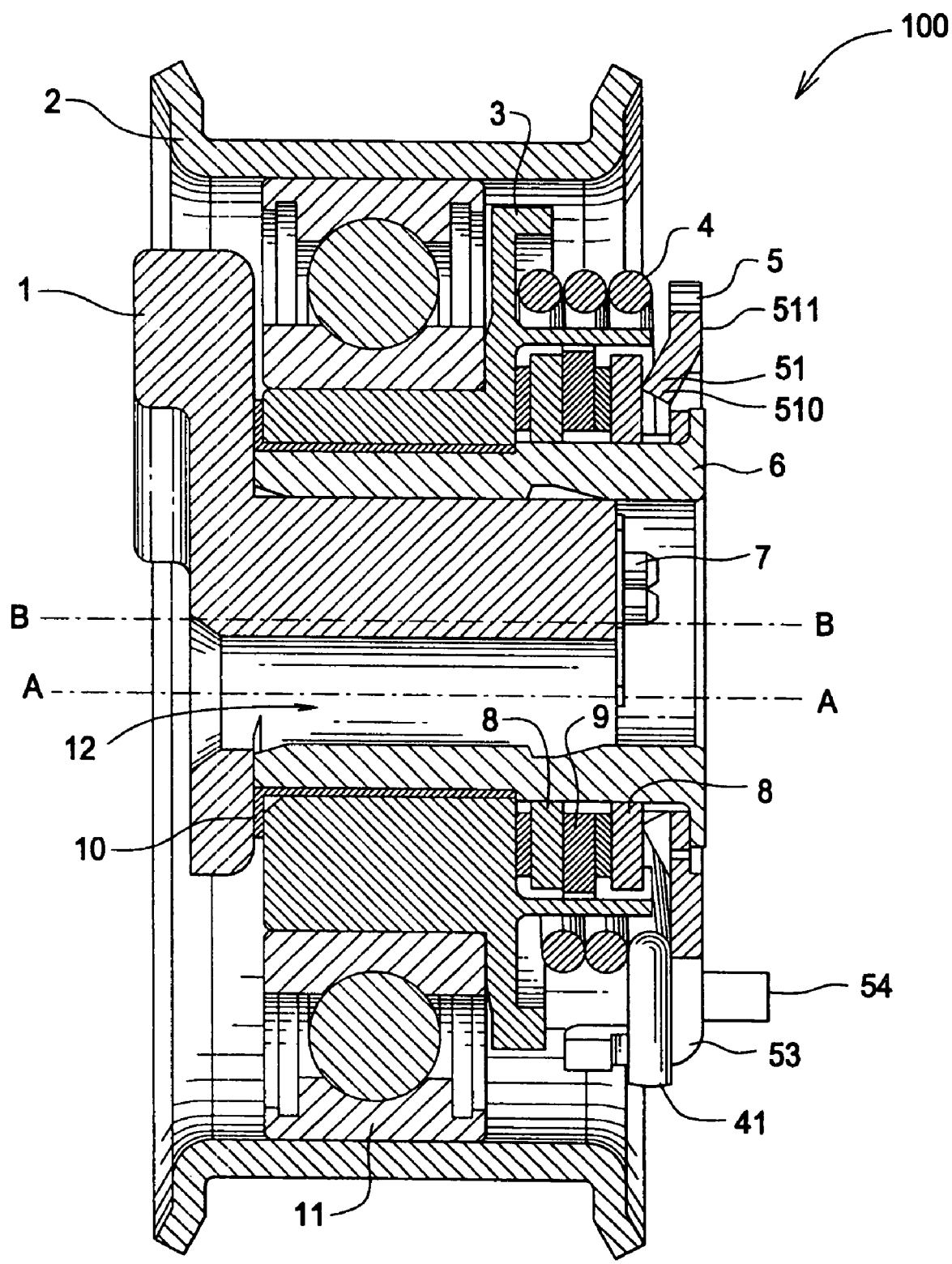
FIG. 1 is a cross sectional view of the tensioner.

FIG. 1 is a cross sectional view of the tensioner. The present invention comprises a damped tensioner that can function in an oil saturated environment. The tensioner 100 comprises adjuster 1. Adjuster 1 is eccentric and is used to move the tensioner into proper engagement with the belt during installation.

During installation adjuster 1 is rotated about the bolt or stud (not shown) that passes through bore 12. The axis A-A of bore 12 is eccentrically offset from the axis of rotation B-B of pulley 2.

Adjuster 1 used to precisely load the belt with a predefined tension by compensating for all component tolerances. Adjuster 1 is used only during belt installation and is locked in place once the belt is installed by fully engaging a fastener with a mounting surface.

Pulley 2 engages a belt to provide belt tension or load. Pulley 2 is journalled to arm 3 about a bearing 11, Pulley 2 is engaged with the bearing outer race. Bearing 11 comprises a ball bearing as shown, but could also comprise a needle bearing or other suitable bearing known in the art.

Arm 3 is biased by torsion spring 4 thereby urging a pulley 2 into a belt (not shown). Pivotal movement of arm 3 allows the tensioner to compensate for any changes in belt length as the belt stretches over time and as the drive length changes from thermal expansion. Arm 3 pivots about a bushing 10.

Arm 3 is engaged with the bearing inner race. Pulley 2 and is pressed into engagement against a belt by a torsion spring 4. A first end 42 of torsion spring 4 is engaged with arm 3 at slot 33. The other end 41 of torsion spring 4 is engaged with base 5 at member 53.

Base 5 is statically fixed during installation to a mounting surface such as an engine (not shown). The spring torque from spring 4 and the effective arm length of arm 3 creates a belt load or tension.

Arm 3 is pivotally engaged about sleeve 6. Bushing 10 comprises a low friction material for facilitating relative movement of the arm 3, for example, brass, copper and sintered metal.

Base 5 comprises three features and functions. As previously mentioned, the base is used to mount the tensioner to an engine mounting surface, and it is used to secure one end of the spring 4. Tang 54 engages a receiving member on a mounting surface such as a hole (not shown) and is used to prevent rotation of the base 5 during installation.

The third feature comprises leaf springs 51. One or more cantilever leaf springs 51 are stamped into the base 5. Each leaf spring is a cantilever style spring with one end 511 connected to the base 5 and a free end 510 which projects away from the base.

Each spring 51 exerts a spring force which is used to load friction disks 8, which in turn create friction damping (normal force×coefficient of friction). The damping controls and reduces arm oscillations during operation. This tensioner configuration is particularly suitable for use in an oil environment wherein the presence of a lubricant (oil) on the friction disks would otherwise tend to defeat a dry frictional damping function. Hence, the tensioner operates with the friction disks being in a lubricant saturated condition.

Each leaf spring 51 is compressed and thereby elastically deformed during the assembly process. This also compensates for any manufacturing tolerances. Once the tensioner is assembled each leaf spring 51 applies a spring force to the stack of friction disks 8 with a spring curve which is equal to the Young's modulus of the leaf spring material.

Each friction disk 8 is mounted to sleeve 6. Each friction disk 8 comprises a flat portion 81 that engages a cooperating flat portion 61 to prevent rotation of each disk 8 with respect to sleeve 6. Friction disks 8 are pressed together by leaf springs 51 against arm surface 34. The frictional force thereby created damps oscillatory motion of arm 3.

Friction separator plate 9 is statically fixed to arm 3 through mechanical engagement of tangs 91 with arm 3 and is used to enable use of a second friction disk 8, all of which are disposed in a stacked manner.

The material for each friction disk 8 is selected to prevent stick-slip while operating in a lubricant saturated condition. The material used for friction disk 8 and separator plate 9 comprises cellulosic or graphite paper bonded to a steel backing.

Retainer 7 is used to hold the tensioner together until it is mounted on the mounting surface. Retainer 7 may comprise a snap-ring, circlip or other suitable retention device known in the art.

Bushing 10 allows the arm 3 to smoothly rotate about sleeve 6. Bushing 10 also contributes to friction damping.

Figure 2:
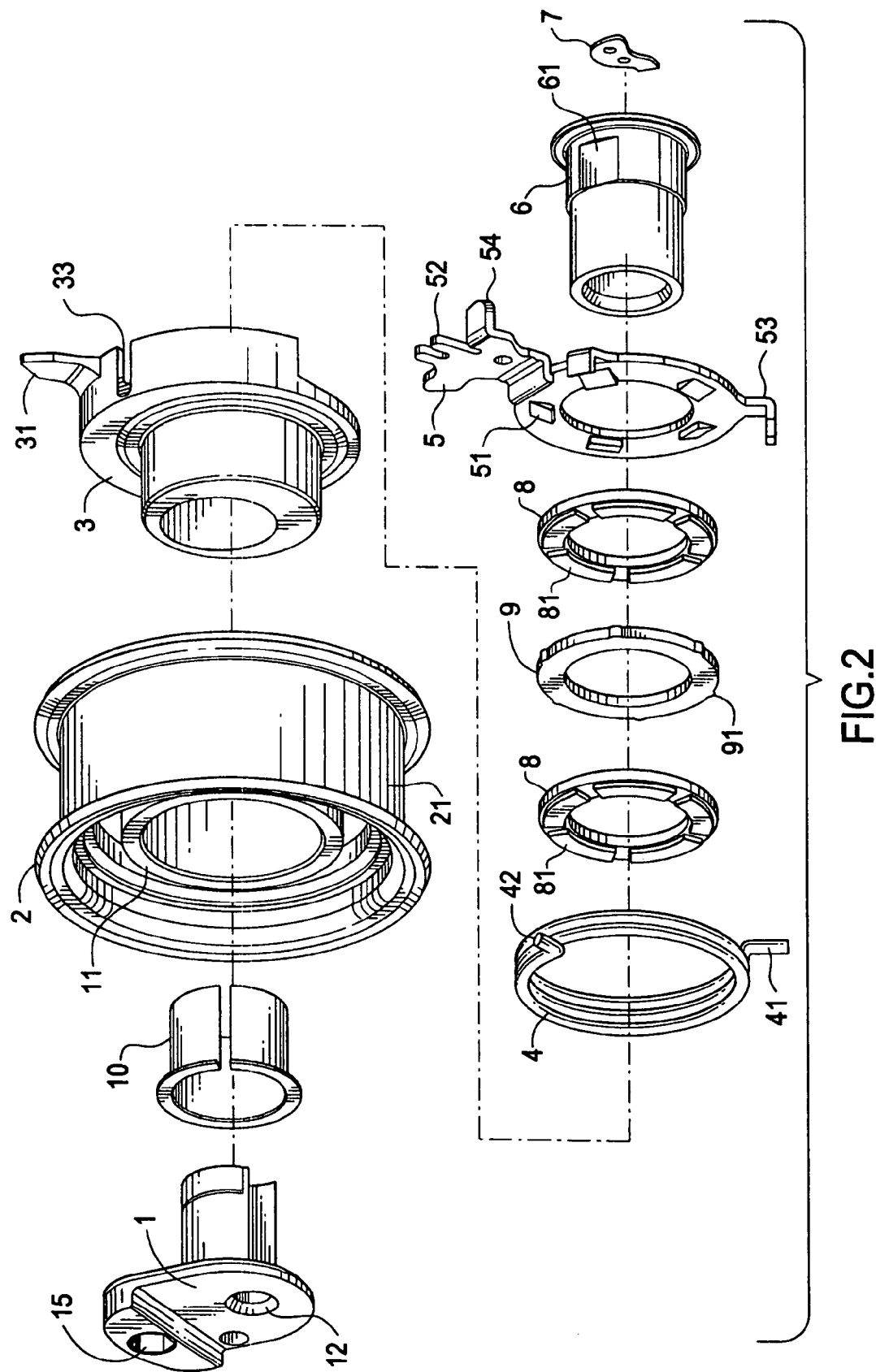
FIG. 2 is an exploded view of the tensioner.

FIG. 2 is an exploded view of the tensioner. Arm indicator 31 cooperates with base indicator 52 to display when the tensioner is properly installed and loaded during installation.

Pulley 2 comprises a belt engaging surface 21 which may be flat as shown, or any other suited profile known in the art.

Adjuster 1 further comprises a tool receiving portion 15. A tool such as a ratchet (not shown) may be engaged with the adjuster during installation at tool receiving portion 15. The tool is used to rotate adjuster 1 about a fastener such as a bolt (not shown).

Damping is generated as a result of the reaction force or hub load generated by the spring force which is used to tension the belt. The application of the hub load to the bushing 10 contributes to damping arm movement as a result of the product of the normal force multiplied by the bushing's coefficient of friction.

In an oil environment the coefficient of friction drops as a result of the presence of oil and therefore reduces the amount of friction damping. It is simply not practical or advisable to increase the reaction force to generate more damping since an increase in this force could be detrimental to belt life and performance. It is also the case that the required force would generate a pressure on the friction surface that would likely be too great for the friction material to handle for any reasonable period of time.

In operation, the arm 3 oscillates about the bushing 10. Movement of arm 3 is damped for proper tensioner function by use of the leaf springs 51 described herein. Integration of each leaf spring 51 into the base represents a substantial commercial advantage in terms of cost by eliminating the need to add an additional spring part, such as a Belleville spring.

Further, integration of one or more leaf springs 51 into the base 5 is advantageous because the spring rate for each leaf can be relatively very low to keep damping substantially constant with typical manufacturing and assembly tolerances as well as with the wear of the friction disks 8. To keep the leaf spring rate low and to make it possible to be a stamped component in the base, the base material comprises a low carbon steel or steel in a "smooth condition" in which the length of each leaf spring 51 is a function of the required axial force. For example, leaf spring deflection f for a given load P:

$$f = Pl^3/3EI$$

where l=spring length, E=Young's modulus and I=moment of inertia ($bh^3/12$).

By way of example and not of limitation, the spring rate for each leaf spring is approximately $2 \times 10^6$ N/m. The force per spring for five springs is approximately 25.2 N. The example spring values generate 0.68 Nm of resistant torque to generate approximately 50% damping with three friction surfaces (friction surfaces on disks 8) that have a wet coefficient of friction of approximately 0.12 with each friction disk 8 having a size of 25 mm inner diameter and 35 mm outer diameter.

The disclosed tensioner represent a significant advantage over the prior art which uses a single disk spring, which will necessarily require a very high spring rate for the disk spring in order to develop the required damping friction. For example, a very high spring rate required by the small working range (100N/mm) can cause a significant change in damping based on assembly tolerances, namely, deviations in tolerances can cause wide variations in spring force when one considers that the amount of compression over a tenth of a millimeter error may significantly increase or reduce the developed frictional force. Consequently, in prior art tensioners it is possible that small changes in part tolerances common to manufacturing could cause tensioner damping to change dramatically from one tensioner to another during manufacturing.

Although a form of the invention has been described herein, it will be obvious to those skilled in the art that variations may be made in the construction and relation of parts without departing from the spirit and scope of the invention described herein.

We claim:

1. A tensioner comprising:

a base;

an arm pivotally engaged with the base;

a pulley journalled to the arm;

a torsion spring engaged between the arm and the base;

the base comprising a cantilever leaf spring;

a first friction disk operationally disposed between the cantilever leaf spring and the arm, the cantilever leaf spring biasing the first friction disk into frictional contact with the arm, the first friction disk rotationally fixed with respect to the base;

a second friction disk rotationally fixed with respect to the base;

a separator member disposed between the first friction disk and the second friction disk;

the first friction disk and the second friction disk each having a wet coefficient of friction of approximately 0.12; and the separator member rotationally fixed with respect to the arm.

2. The tensioner as in claim 1 further comprising a plurality of cantilever leaf springs.

3. The tensioner as in claim 1, wherein the cantilever leaf spring is stamped into the base.

4. The tensioner as in claim 1, wherein the first friction disk and the second friction disk each comprises a flat portion cooperatively engagable with a sleeve flat portion to prevent a rotation of each friction disk with respect to the sleeve.

5. The tensioner as in claim 1, wherein the cantilever leaf spring comprises a spring rate of approximately $2\times10^6$ N/m.

6. The tensioner as in claim 1, wherein the first friction disk and the second friction disk is saturated with a lubricant.

* * * * *